US006632118B2

(12) United States Patent
Jacob

(10) Patent No.: US 6,632,118 B2
(45) Date of Patent: Oct. 14, 2003

(54) METHOD OF CONNECTING WORKPIECES

(75) Inventor: Heinz-Juergen Jacob, Norderstedt (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 202 days.

(21) Appl. No.: 09/912,124

(22) Filed: Jul. 24, 2001

(65) Prior Publication Data

US 2002/0029836 A1 Mar. 14, 2002

(30) Foreign Application Priority Data

Jul. 27, 2000 (DE) .......................... 100 36 614

(51) Int. Cl.⁷ .......................... H01J 35/10; B23K 20/12
(52) U.S. Cl. ...................... 445/28; 378/144; 228/112.1; 228/159
(58) Field of Search ............................ 445/28; 378/127, 378/128, 143, 144; 228/112.1, 113, 114, 114.5, 159, 160, 161

(56) References Cited

U.S. PATENT DOCUMENTS

| 3,429,591 A | | 2/1969 | Loyd et al. .................. 285/189 |
| 4,119,261 A | | 10/1978 | Devine, Jr. .................. 228/113 |
| 4,187,442 A | * | 2/1980 | Hueschen et al. ........... 378/128 |
| 4,333,671 A | * | 6/1982 | Holko .................... 285/148.12 |
| 4,445,265 A | | 5/1984 | Olson et al. .................. 29/447 |
| 4,501,566 A | * | 2/1985 | Carlson et al. ................ 445/28 |
| 5,088,638 A | * | 2/1992 | Karaev et al. ............ 228/112.1 |
| 5,930,332 A | * | 7/1999 | Eggleston et al. ........... 378/144 |
| 5,979,742 A | * | 11/1999 | Enomoto et al. ......... 228/112.1 |
| 5,993,280 A | * | 11/1999 | Rodhammer et al. .......... 445/28 |
| 6,051,325 A | * | 4/2000 | Talwar et al. ................ 428/593 |
| 6,105,849 A | * | 8/2000 | Mochizuki et al. ....... 228/112.1 |
| 6,325,567 B1 | * | 12/2001 | Kato et al. ................... 403/270 |
| 6,390,875 B1 | * | 5/2002 | Warren et al. ................ 445/28 |
| 6,449,339 B2 | * | 9/2002 | Yasutake .................... 378/144 |
| 6,477,236 B1 | * | 11/2002 | Anno et al. ................. 378/144 |

FOREIGN PATENT DOCUMENTS

| DE | 29623218 | 2/1998 | ............. H01J/9/18 |
| WO | WO9532833 | 12/1995 | ........... B23K/20/12 |

* cited by examiner

Primary Examiner—Dean A. Reichard
Assistant Examiner—Adolfo Nino
(74) Attorney, Agent, or Firm—John Vodopia

(57) ABSTRACT

The invention relates to a method of connecting workpieces which is suitable notably for connecting an anode rod (5) to an end plate (6) of a rotor sleeve (7) in a rotary anode X-ray tube where on the one hand adequate strength is required and on the other hand an as small as possible cross-section of the anode rod so as to realize a heat barrier. The method is characterized mainly in that the objects are connected to one another by friction welding and that the cross-section is reduced, that is, outside a connecting zone in which the friction weld is situated, in such a manner that the strength of the connecting zone is at least slightly greater than that of the segment of reduced cross-section.

23 Claims, 2 Drawing Sheets

METHOD OF CONNECTING WORKPIECES

BACKGROUND OF THE INVENTION

1. Field of the Invention

The invention relates to a method of connecting a first workpiece to a second workpiece, for example, a method of connecting an anode rod to an end plate of a rotor sleeve in a rotary anode X-ray tube.

2. Description of the Related Art

In addition to a device for generating an electron beam, rotary anode X-ray tubes include essential components such as a rotor sleeve, one end of which is closed by an end plate, as well as an anode rod (anode shaft) which is connected thereto and supports an anode disc (rotary anode).

Said components are made of very different materials. Whereas the rotor sleeve is usually made of copper, the end plate consists of an iron nickel cobalt alloy (FeNiCo) or nickel 42, and the anode rod often is made of a tungsten zirconium molybdenum alloy (TZM). Generally speaking, the anode rod is connected to the end plate by soldering while using a high-temperature solder. Said materials, however, have very different melting points so that the soldered joint is often faulty due to solder gaps, bonding faults etc. However, because the rotor and notably the anode rod may be subject to severe mechanical loads due to shocks or unbalance of the rotary system, particularly this joint must satisfy very severe requirements.

The problem is accentuated by the fact that the anode rod should also act as a thermal barrier in order to avoid an increased heat flow from the anode disc to the rotor sleeve and the rotary system situated therebelow, and hence the cross-sectional surface area of this rod should be as small as possible.

Because of the foregoing, the rejection rate due to soldered joints that are faulty to even a small extent only is comparatively high and the strength that can be achieved by way of this joint is comparatively low.

DE-OS 29 15 418 discloses a method of connecting workpieces consisting of materials having very different melting points; according to this method the connection surfaces of the workpieces are mechanically joined by friction welding after which they are permanently bonded by diffusion welding. This method, however, has a significant drawback in that it is rather intricate because of the two welding operations and that the quality and strength of the joint often are not reproducible.

SUMMARY OF THE INVENTION

Therefore, it is a principal object of the invention to provide a method of connecting a first workpiece to a second workpiece which enables these workpieces, for example an anode rod and an end plate in a rotary anode X-ray tube, to be connected to one another in a reproducible manner and with a high strength.

This object is achieved by means of a method in accordance with the invention which includes the following steps:

friction welding the first workpiece to the second workpiece;

reducing the cross-section of at least one of the two workpieces in a segment which lies outside a connection zone in which the friction weld is situated, that is, in such a manner that the strength of the connection zone is at least slightly greater than that of the segment of reduced cross-section.

Thus, the resistance to fracture is no longer imposed by the friction weld and any, hardly predictable material influencing that is caused thereby, but exclusively by the strength of the segment of reduced cross-section. Because this strength is dependent exclusively on the type of material used and on the cross-section per se, the strength of the joint achieved in accordance with the invention can be reliably reproduced.

The reduction of the cross-section at the same time reduces the thermal conductivity; this is particularly advantageous for the described application in rotary anode X-ray tubes. The cross-section is made only as large as absolutely necessary for achieving the strength required for reliable operation. The reduction of the cross-section thus advantageously combines two different functions.

A further advantage resides in the fact that the method is also suitable for the connection of workpieces of materials having very different melting points, because any influencing of the strength of the friction weld due to said differences can be taken into account by a correspondingly greater reduction of the cross-section relative to that of the connecting zone so as to achieve said object nevertheless.

Depending on the type, shape and dimensions of the workpieces to be connected, the method may also be executed in such a manner that first the cross-section of one of the workpieces is reduced and subsequently friction welding is performed.

The dependent claims relate to advantageous further embodiments of the invention.

The further embodiment in conformity with claim 2 is useful for most materials, because the heat caused by friction welding could weaken the material in the areas of the workpieces that adjoin the welded surfaces.

The embodiment disclosed in claim 3 is intended to achieve a further reduction of the thermal conductivity.

Finally, claim 4 discloses a particularly attractive application for the method in accordance with the invention.

BRIEF DESCRIPTION OF THE DRAWINGS

Further details, features and advantages of the invention will become apparent from the following description of a preferred embodiment that is given with reference to the drawing. Therein.

DETAILED DESCRIPTION OF THE PRESENTLY PREFERRED EMBODIMENTS

Figure 1:
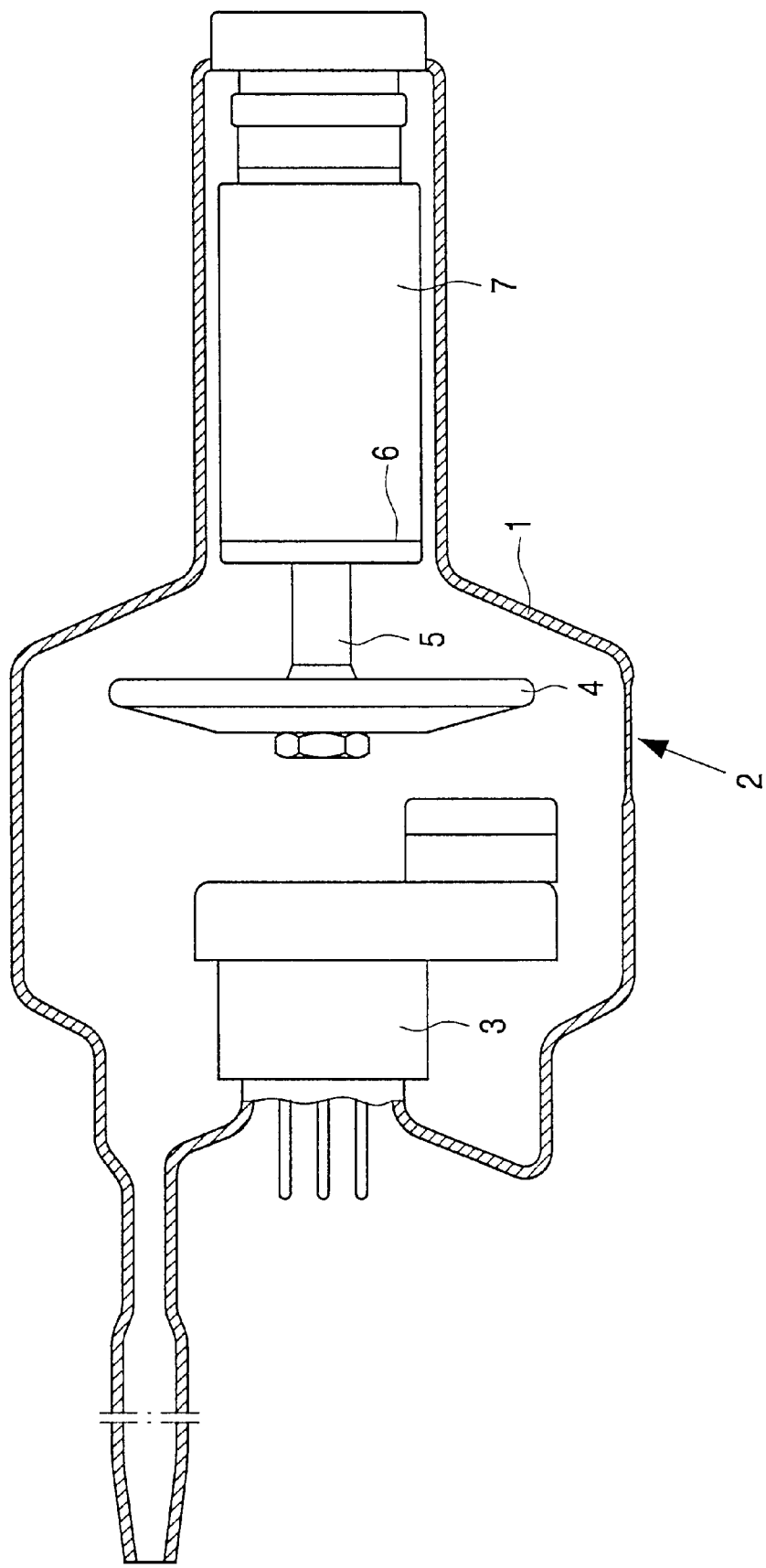
FIG. 1 is a diagrammatic longitudinal sectional view of a rotary anode X-ray tube.

A rotary anode X-ray tube as shown in FIG. 1 includes an X-ray envelope 1 which accommodates a cathode arrangement 3 for generating an electron beam as well as a facing rotary anode arrangement. The latter arrangement includes essentially a rotary anode disc 4 which is mounted so as to be replaceable at one end of an anode rod 5. The other end of the anode rod 5 is connected to an end plate 6 of a cylindrical rotor sleeve 7.

The electron beam generated by the cathode arrangement 3 is incident on the oblique segment of the anode disc 4 and hence produces X-rays that emanate from the tube 1 via an exit window 2.

The anode disc 4 is rotated in known manner, via the anode rod 5 and the rotor sleeve 7, so as to avoid overheating of the anode disc 4.

On the one hand the anode rod 5 should transmit the rotary motion and reliably support the anode disc 4 also in the event of shocks or unbalance of the rotary system, while on the other hand it should also serve as a heat barrier in order to prevent the previously described excessive heat flow in the rotor sleeve and the drive system.

The anode rod 5 is usually connected to the anode disc 4 by screwing, so that this connection is not critical in this respect. In order to satisfy the described requirements, the anode rod 5 is connected to the end plate 6 by means of a method in accordance with the invention.

Figure 2:
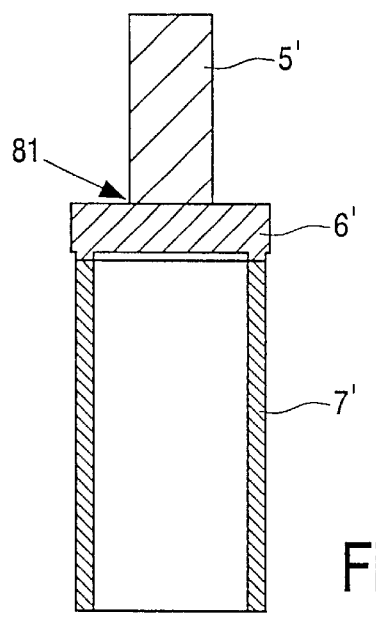
FIG. 2 is a diagrammatic longitudinal sectional view of a part of an anode rod and a rotor sleeve during manufacture.

FIG. 2 shows the relevant components in a raw state, that is, a rotor sleeve 7' with an end plate 6' arranged thereon, as well as a solid rod 5'. The rod 5', the rod end plate 6' and the rotor sleeve 7' are first connected to one another by friction welding. The friction weld zone formed by the friction weld between the rod 5' and the end plate 6' is denoted by the reference numeral 81.

Figure 3:
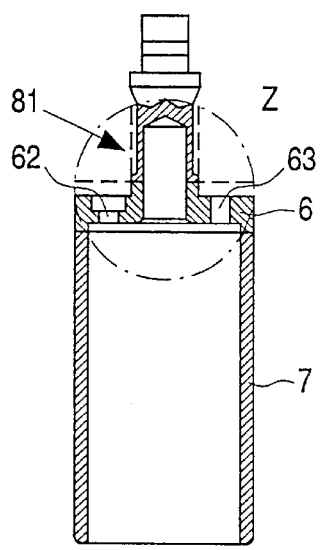
FIG. 3 is a diagrammatic sectional view as shown in FIG. 2 after the manufacture.

Subsequently the configuration shown in FIG. 3 is formed therefrom. In conformity with the rendition at a larger scale in FIG. 4, the zone 61 on the end plate 6', defined by a dashed line, and the zone 51, also denoted by a dashed line, on the circumference of the rod 5' are removed by milling or another manner, thus providing the rod with a segment 52 of reduced cross-section.

It is essential that the removal of the zone 51 at the circumference of the (worked) rod 5' does not extend into a connection zone 82 which includes the friction weld zone 81 as well as heat influencing zones around this friction weld zone 81. The heat influencing zones are the zones in which the properties of the material, notably its strength, could be influenced by the heat produced by friction welding.

The end plate 6' and the rod 5' are both also provided with a common bore 83. Further bores 62, 63 are provided in the end plate 6 serve for the mounting of the rotary system.

Figure 4:
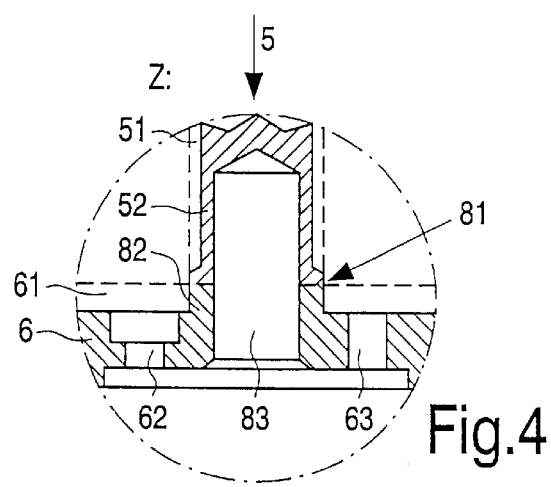
FIG. 4 shows a detail of FIG. 3.

As is shown in FIG. 4, the wall thickness of the connection zone 82 is thus greater than the wall thickness of the segment 52 of the (finished) anode rod 5.

The relative all thickness of the connection zone 82 and the segment 52 are then proportioned in such a manner that the following conditions are satisfied.

The wall thickness of the segment 52 is only as large as absolutely necessary to achieve a (still) adequate strength for the transmission of the rotary motion to the anode disc 4 while taking into account possible shock loads and unbalance of the rotary system. It is thus achieved that the heat flow from the anode disc to the rotor sleeve 7 and the drive system remains as small as possible.

The wall thickness of the connection zone 82, however, is chosen to be so large that the strength of this zone is greater than the strength of the segment 52. The required wall thickness is dependent notably on the degree of influencing of the strength of the material used in the thermal influencing zone arising due to the friction welding. For example, in the case of TZM (tungsten zirconium molybdenum), that is often used for the manufacture of the anode rod the strength in this thermal influencing zone is halved. This means that the wall thickness in the connection zone 82 must equal at least twice the wall thickness in the segment 52.

The joint in conformity with the invention thus satisfies the requirement as regards adequate strength, being determined only by the type of the material used for the anode rod 5 and by the wall thickness of the segment 52, as well as the demand for an as low as possible thermal conductivity, that is, a heat barrier for protecting the rotary system against excessive heating.

As has already been explained, the order of the two steps in conformity with the invention is not essential and can also be reversed if so desirable for technical or other reasons.

What is claimed is:

1. A method of connecting a first workpiece to a second workpiece, which method comprises the following steps:

friction welding the first workpiece to the second workpiece;

reducing the cross-section of at least one of the two workpiece in a segment which lies outside a connection zone in which the friction weld is situated, that is, in such a manner that the strength of the connection zone is at least slightly greater than that of the segment of reduced cross-section.

2. The method of claim 1, wherein the connection zone comprises at least one thermal influenced zone formed on one of the workpiece due to the friction welding.

3. The method of claim 2:

wherein a region where the segment is reduced must not extend into said connection zone.

4. The method of claim 3:

wherein a thickness of the connection zone is dependent on a degree of influence due to friction welding on the at least one thermal influenced zone.

5. The method of claim 4:

wherein a common bore is provided through both the end plate and the anode rod; and wherein said thickness of the connecting zone is a wall thickness.

6. The method of claim 4:

wherein the anode rod is manufactured from tungsten zirconium molybdenum (TZM);

wherein the at least one thermal influenced zone is on the anode rod;

wherein the strength of the at least one thermal influenced zone is halved during friction welding; and wherein the thickness of the connecting zone must be at least twice the thickness of the segment.

7. The method of claim 1, at least one of the workpiece is provided with a bore.

8. The method of claim 1, wherein the first workpiece comprises an end plate of a rotor sleeve and the second workpiece comprises an anode rod for connection of an anode disc in a rotary anode X-ray tube, the cross-section of the segment of the second workpiece being reduced by milling to such an extent that an as low as possible thermal conductivity is achieved in conjunction with a strength that is still adequate.

9. The method of claim 8:

wherein an anode disc is connected to the anode rod; and wherein a thickness of the segment is only as large as necessary to achieve an adequate strength for transmission of rotary motion to said anode disc while taking into account possible shock loads and unbalance;

whereby a heat flow from said anode disc to the rotor sleeve remains as small as possible.

10. The method of claim 9:

wherein a common bore provided through both the end plate and the anode rod; and wherein said thickness of the segment is a wall thickness.

11. A rotary X-ray tube comprising an end plate of a rotor sleeve and an anode rod connected to an anode disc, said rotary anode X-ray tube being manufactured according to the method of claim 1, wherein said end plate comprises the first workpiece and said anode rod comprises the second workpiece.

12. The method of claim 1, wherein the material comprising the first workpiece has a different melting point than the material comprising the second workpiece.

13. A rotary anode X-ray tube comprising:
   an anode rod;
   an end plate of a rotor sleeve;
   a connection zone where the anode rod is friction-welded to the end plate; and
   a segment of the anode rod located outside the connection zone and having a cross-section which has been reduced such that the strength of the connection zone is at least slightly greater than that of said segment.

14. The rotary anode X-ray tube of claim 13, wherein the connection zone further comprises:
   at least one thermal influenced zone on at least one of the end plate and the anode rod where the material is influenced by the friction welding.

15. The rotary anode X-ray tube of claim 14:
   wherein a region where the segment is reduced must not extend into the connection zone.

16. The rotary anode X-ray tube of claim 14:
   wherein a thickness of the connection zone is dependent on a degree of influence due to friction welding on the at least one thermal influenced zone.

17. The rotary anode X-ray tube of claim 16, further comprising:
   a common bore provided through both the end plate and the anode rod;
   wherein said thickness of the connection zone is a wall thickness.

18. The rotary anode X-ray tube of claim 16:
   wherein the anode rod is manufactured from tungsten zirconium molybdenum (TZM);
   wherein the at least one thermal influenced zone is on the anode rod;
   wherein the strength of the at least one thermal influenced zone is halved during friction welding; and
   wherein the thickness of the connecting zone must be at least twice the thickness of the segment.

19. The rotary anode X-ray tube of claim 13, further comprising:
   an anode disc connected to the anode rod;
   wherein a thickness of the segment is only as large as necessary to achieve an adequate strength for transmission of rotary motion to said anode disc while taking into account possible shock loads and unbalance;
   whereby a heat flow from said anode disc to the rotor sleeve remains as small as possible.

20. The rotary anode X-ray tube of claim 19, further comprising:
   a common bore provided through both the end plate and the anode rod;
   wherein said thickness of the segment is a wall thickness.

21. The rotary anode X-ray tube of claim 13, further comprising:
   a zone on the end plate which is also reduced.

22. The rotary anode X-ray tube of claim 13, wherein the material comprising the anode rod has a different melting point than the material comprising the end plate of the rotor sleeve.

23. The method of claim 13, further comprising the step of:
   reducing a zone on the end plate.

* * * * *